United States Patent [19]
Belenkiy et al.

[11] Patent Number: 5,774,612
[45] Date of Patent: Jun. 30, 1998

[54] ADAPTED FOR INTERCONNECTING OPTICAL FIBER CONNECTORS

[75] Inventors: Yuriy Belenkiy, Niles; Igor Grois, Northbrook; Mark Margolin, Lincolnwood; Ilya Makhlin, Wheeling, all of Ill.

[73] Assignee: Molex Incorporated, Lisle, Ill.

[21] Appl. No.: 900,344

[22] Filed: Jul. 25, 1997

Related U.S. Application Data

[63] Continuation of Ser. No. 510,212, Aug. 2, 1995, abandoned.

[51] Int. Cl.⁶ .................................................... G02B 6/38
[52] U.S. Cl. ............................... 385/72; 385/56; 385/60; 385/70
[58] Field of Search ................................. 385/53, 55, 56, 385/60, 70, 72, 77, 78

[56] References Cited

U.S. PATENT DOCUMENTS

| 5,073,042 | 12/1991 | Mulholland et al. | 385/56 |
| 5,233,674 | 8/1993 | Vladic | 385/56 |
| 5,274,729 | 12/1993 | King et al. | 385/134 |
| 5,317,663 | 5/1994 | Beard et al. | 385/70 |
| 5,333,222 | 7/1994 | Belenkiy et al. | 385/70 |
| 5,348,487 | 9/1994 | Marazzi et al. | 385/78 |
| 5,359,688 | 10/1994 | Underwood | 385/56 |
| 5,408,557 | 4/1995 | Hsu | 385/72 |
| 5,542,015 | 7/1996 | Hultermans | 385/55 |

Primary Examiner—Rodney B. Bovernick
Assistant Examiner—Hemang Sanghavi
Attorney, Agent, or Firm—A. A. Tirva

[57] ABSTRACT

An adapter assembly is provided for interconnecting a pair of opposing optical fiber connectors generally along an optical axis. A unitary adapter housing has an axial cavity extending in a direction between opposite ends thereof. One end of the housing has a first interconnection operatively associated with a first one of the air of opposing optical fiber connectors. A unitary insert is mounted in the axial cavity of the adapter housing and includes a second interconnection operatively associated with the second of the pair of opposing optical fiber connectors at the opposite end of the housing.

3 Claims, 3 Drawing Sheets

ADAPTED FOR INTERCONNECTING OPTICAL FIBER CONNECTORS

CROSS REFERENCE TO RELATED APPLICATION

This application is a continuation application of U.S. patent application Ser. No. 08/510,212 filed on Aug. 2, 1995, entitled "ADAPTER FOR INTERCONNECTING OPTICAL FIBER CONNECTORS", which prior application is assigned to the same assignee as the assignee of the present application.

FIELD OF THE INVENTION

This invention generally relates to the art of connecting devices and, particularly, to an adapter for interconnecting a pair of opposing optical fiber connectors such as SC-type and FC-type connectors.

BACKGROUND OF THE INVENTION

Optical fibers are used for high speed communications and data transmissions. Optical fiber connectors are used on opposing fiber ends to provide means for readily coupling and uncoupling the fiber ends in a quick-release fashion. Rather than providing male (plug) and female (receptacle) connectors as is prevalent in the electrical connector art, optical fiber connectors often are interconnected by adapters which not only interconnect a pair of opposing optical fiber connectors, but the adapters facilitate aligning the optical fibers to prevent transmission losses at any given interconnecting interface.

One type of optical fiber connector design commonly is identified as an "SC" connector, first manufactured by Nippon Telegraph and Telephone Co. of Japan. Generally, this type of interconnection is based on a push-pull concept. Plug-type couplings or connectors are terminated to opposing optical fiber ends. When an adapter is used, it is designed as a double-ended receptacle for receiving the opposing optical fiber connectors, but in a push-pull fashion. The connectors and the adapter have complementary interengaging latch means, such as hooked latch arms for engaging latch bosses, to interconnect the adapter and the connectors.

An adapter assembly for SC-type optical fiber connectors is shown in U.S. Pat. No. 5,333,222 to Belenkiy et al, dated Jul. 26, 1994 and assigned the assignee of the present invention, as well as in U.S. Pat. No. 5,317,663 to Beard et al, dated May 31, 1994.

Another type of optical fiber connector design commonly is identified as an "FC" connector. Generally, this type of interconnection is based on a screw or threaded concept. A conventional FC-type connector includes a body or housing surrounded by a concentric, relatively rotatable ring that is internally threaded for screw-coupling to a complementary externally threaded connecting device.

An adapter for FC-type optical fiber connectors is shown in U.S. Pat. No. 5,408,557 to Hsu, dated Apr. 18, 1995.

An adapter for interconnectors of SC-type connectors to FC-type connectors designs heretofore available, is are fabricated with two interconnected halves. Each half defines one receptacle end of the adapter for receiving a respective one of the opposing optical fiber connectors. Consequently, some form of means must be provided for joining or interconnecting the adapter halves. This creates cost problems in both parts and assembly time. Most often, the adapter halves are provided with radially outwardly extending flanges which are abuttingly engaged, and fasteners (such as rivets or bolts) are used to rigidly join the flanges outside the bounds of the adapter body defined by the two halves thereof. Such flanges take up valuable "real estate" in compact or tight interconnection environments, and, as stated above, the use of such fasteners or rivets require additional and expensive manufacturing steps.

Lastly, in some adapters, internal inserts are used as the means for interconnection with the opposing optical fiber connectors. This is particularly true in SC-type adapters, such as shown in the above U.S. Pat. Nos. 5,317,663 and 5,333,222. The inserts, themselves, may be provided as insert halves to further increase the number of components of the adapter assembly.

The present invention is directed to solving the myriad of problems discussed above by providing a unique adapter assembly fabricated of only two main parts, including a unitary adapter housing and a unitary internal insert, with the interconnection for one of the optical fiber connectors being on the unitary housing and the other interconnection being on the unitary insert.

SUMMARY OF THE INVENTION

An object, therefore, of the invention is to provide a new and improved adapter assembly for interconnecting a pair of opposing optical fiber connectors.

Generally, the adapter assembly interconnects the connectors along an optical axis. As is well known in the art, each connector includes an axially projecting ferrule. The adapter assembly is constructed generally as a double-ended receptacle for receiving the connectors at opposite ends thereof.

More particularly, in the exemplary embodiment of the invention, the adapter assembly includes a unitary adapter housing having an axial cavity extending in a direction between opposite ends thereof. One end of the housing has first interconnecting means operatively associated with a first one of the pair of opposing optical fiber connectors. A unitary insert is mounted in the axial cavity of the adapter housing and includes second interconnecting means operatively associated with the second of the pair of opposing optical fiber connectors at the opposite end of the housing.

As disclosed in the preferred embodiment, the first interconnecting means at the one end of the adapter housing is a screw-type connection for interconnection with a FC-type optical fiber connector. The second interconnecting means on the unitary insert is a push-pull-type connection for interconnection with a SC-type optical fiber connector. The opposite end of the adapter housing is open for receiving therethrough the FC-type connector inserted into the axial cavity into interconnection with the insert in the cavity.

Another feature of the invention is the provision of complementary interengaging snap-latch means between the insert and the adapter housing for latching the insert in the axial cavity automatically in response to inserting the insert into the cavity. Lastly, a sleeve is mounted axially in the unitary insert for receiving and coaxially aligning the conventional ferrules of the pair of opposing optical fiber connectors.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims.

The invention, together with its objects and the advantages thereof, may be best understood by reference to the following description taken in conjunction with the accompanying drawings, in which like reference numerals identify like elements in the figures and in which.

DETAILED DESCRIPTION OF THE PREFERRED EMBODIMENT

Figure 1:
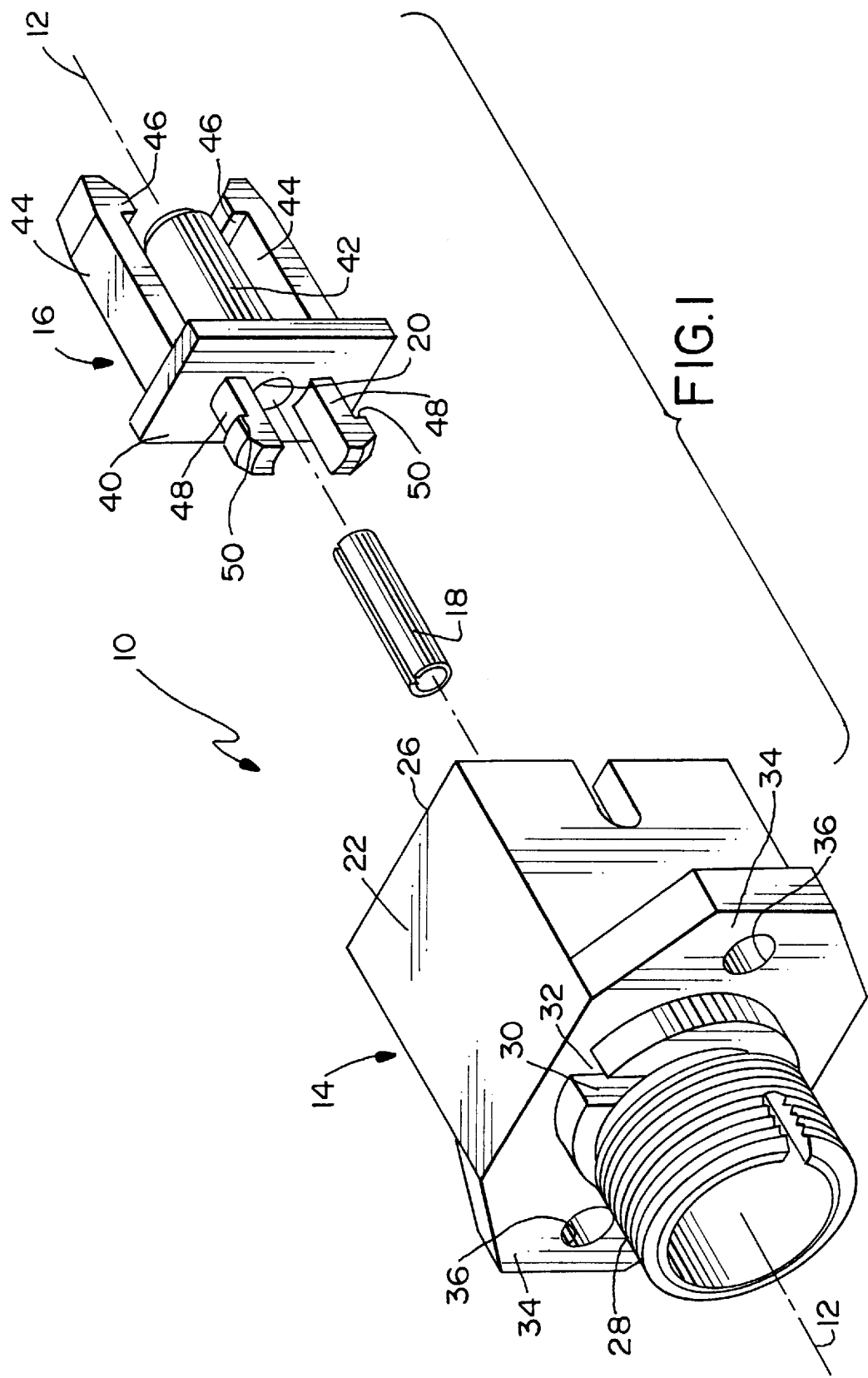
FIG. 1 is an exploded perspective view of the adapter assembly of the invention.
Figure 2:
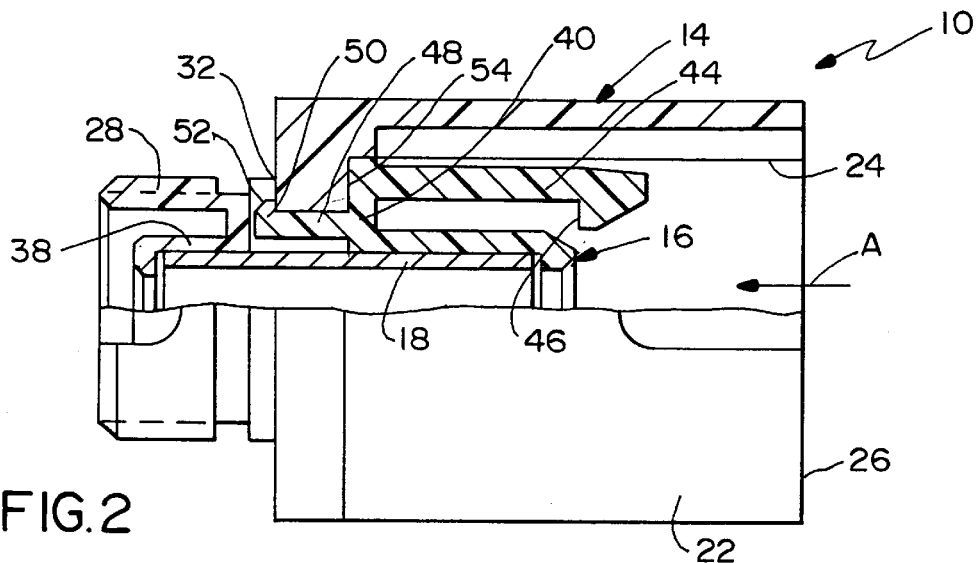
FIG. 2 is a fragmented axial section through the adapter assembly in assembled condition.

Referring to the drawings in greater detail, and first to FIGS. 1 and 2, the invention is embodied in an adapter assembly, generally designated 10, for interconnecting a pair of opposing optical fiber connectors generally along an optical axis 12. The interconnectable optical fiber connectors are not shown, but it should be understood that such connectors are well known in the art and are commonly identified as "SC" and "FC" connectors as fully described in the "Background", above. As also is well known in the art, each connector includes an axially projecting ferrule, often of ceramic material, for surrounding the optical fibers, the ferrules projecting from forward ends of the connectors. Generally, adapter assembly 10 is constructed as a double-ended receptacle for receiving the connectors at opposite ends thereof.

More particularly, as seen in FIGS. 1 and 2, adapter assembly 10 basically includes only two major components, namely a unitary adapter housing, generally designated 14, and a unitary insert, generally designated 16. In addition, a split sleeve 18 is mounted within a through hole 20 axially in unitary insert 16 for receiving and coaxially aligning the ferrules of the pair of opposing optical fiber connectors. As will be described in detail hereinafter, unitary adapter housing 14 has interconnecting means for operative association with a FC-type connector, and unitary insert 16 has interconnecting means for operative association with a SC-type connector.

Figure 3:
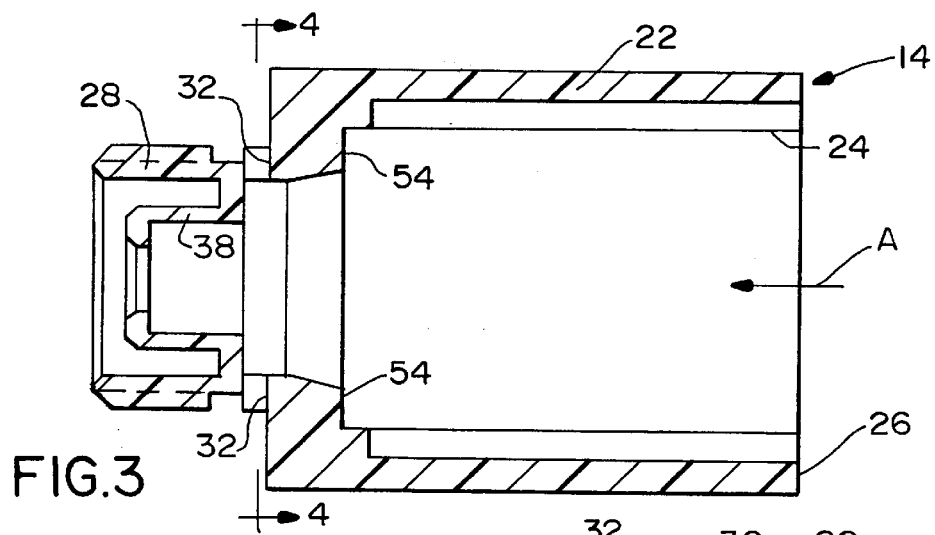
FIG. 3 is an axial section through the unitary adapter housing.
Figure 4:
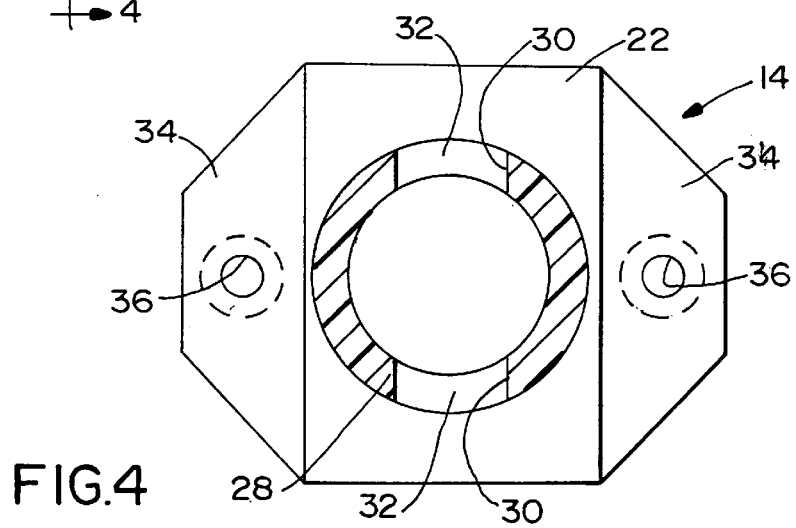
FIG. 4 is a vertical section taken generally along line 4—4 of FIG. 3.
Figure 5:
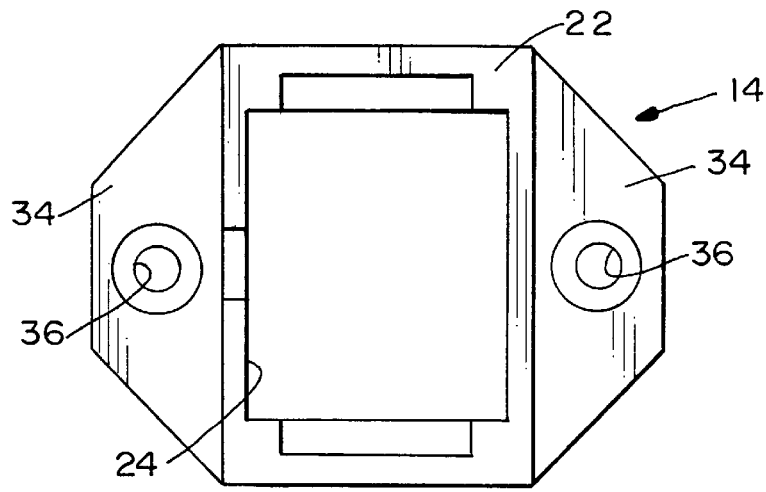
FIG. 5 is an end elevational view looking toward the right-hand end of FIG. 3.

Referring to FIGS. 3–5 in conjunction with FIGS. 1 and 2, unitary adapter housing 14 includes a main body portion 22 having an axial cavity 24 extending between opposite ends of the housing. One end of the housing is open, as at 26, for receiving therethrough unitary insert 16 during assembly, and for receiving therethrough the SC-type connector inserted into interconnection with the insert in the cavity, as described hereinafter. The opposite end of the housing is provided with a first interconnecting means in the form of an externally threaded cylindrical boss 28 which has a known configuration for mating with a conventional FC-type optical fiber connector.

As seen in FIG. 4, a pair of diametrically opposite, radial openings 30 are provided at the juncture between externally threaded boss 28 and main body portion 22. For purposes described hereinafter, these openings define snap-latch shoulders 32 shown clearly in FIGS. 2 and 3. Unitary adapter housing 14 has a pair of outwardly projecting flanges 34 having fastening apertures 36 therethrough for securing the adapter assembly to a panel, for instance. An inner cylindrical boss portion 38 holds the front end of split sleeve 18.

Figure 6:
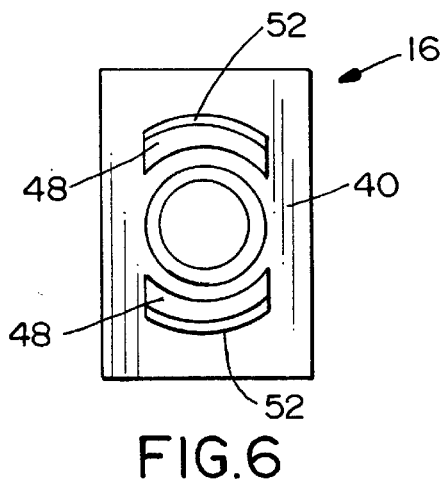
FIG. 6 is an end elevational view of the unitary insert, looking toward the left-hand end of the insert as viewed in FIG. 1.
Figure 7:
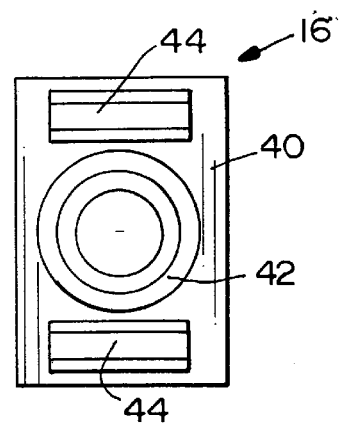
FIG. 7 is an end elevational view looking toward the opposite or right-hand end of the insert.
Figure 8:
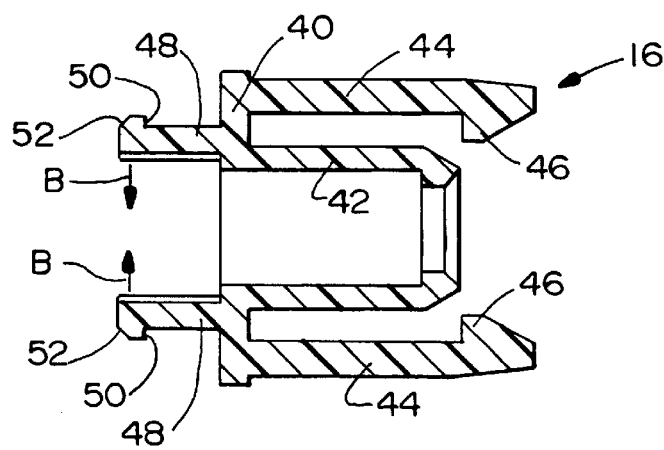
FIG. 8 is an axial section through the unitary insert.

Referring to FIGS. 6–8 in conjunction with FIGS. 1 and 2, unitary insert 16 has a transverse flange 40 for abutting against the forward end of cavity 24 within main body portion 22 of unitary housing 14. A cylindrical holder 42 projects rearwardly of flange 40 and is adapted for receiving split sleeve 18 as shown best in FIG. 2. The insert includes a pair of connecting arms 44 projecting axially rearwardly toward open end 26 of the adapter housing. The connecting arms include hook portions 46 to define a second interconnecting means for interconnection with appropriate latch means on the optical fiber connector as is known in the art with push-pull SC-type connectors.

Generally, complementary interengaging snap-latch means are provided between unitary insert 16 and unitary adapter housing 14 for latching the insert in axial cavity 24 automatically in response to inserting the insert into the cavity in the direction of arrows "A" (FIGS. 2 and 3). More particularly, a pair of latch arms 48 project axially forwardly of flange 40 of the unitary insert outside the bounds of split sleeve 18 as seen best in FIG. 2. The latch arms include latching hook portions 50 which snap behind snap-latch shoulders 32 through radial openings 30 in adapter housing 14. The front of each latching hook portion 50 is chamfered, as at 52 (FIG. 8), so that latch arms 48 can be biased inwardly in the direction of arrows "B" (FIG. 8) automatically as the latch arms engage abutment shoulders 54 (FIG. 3) at the front of cavity 24 of the adapter housing.

Unitary adapter housing 14 is a one-piece structure which may be of die-cast material or molded of plastic material. Unitary insert 16 is a one-piece structure preferably molded of plastic material so that connecting arms 44 and latch arms 48 are inherently resilient.

The assembly of adapter 10 is relatively simple in comparison to most adapter assemblies heretofore available. Split sleeve 18 may be preassembled. Unitary insert 16 is inserted into axial cavity 24 of unitary adapter housing 14 in the direction of arrow "A" (FIGS. 2 and 3), and the assembly is complete. The chamfered front ends 52 of latch arms 48 will engage abutment shoulders 54 at the front end of the cavity and bias the latch arms radially inwardly toward each other. When flange 40 abuts against shoulder 54 at the front end of the cavity, latching hook portions 50 will be in alignment with radial openings 30 and the hook portions will automatically snap back radially outwardly into engagement with snap-latch shoulders 32 at the front end of main body portion 22 of the housing. This simple, singular insertion movement of unitary insert 16 into the housing cavity is effective not only to mount the insert within the housing but to automatically snap-latch the insert within the housing cavity. The adapter assembly now is ready to receive a pair of opposing optical fiber connectors, with a FC-type connector interconnectable with externally threaded boss 28 at one end of the assembly, and with a SC-type connector being insertable into cavity 24, also in the direction of direction of arrow "A", into interconnection with connecting arms 44 and hook portions 46 of unitary insert 16.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An adapter assembly for interconnecting a FC-type optical fiber connector to a SC-type optical fiber connector generally along an optical axis, each connector including an axially projecting ferrule, and the adapter assembly being constructed as a double-ended receptacle for receiving the connectors at opposite ends thereof, comprising:

a unitary, one piece adapter housing having an axial cavity extending in a direction between opposite ends of the housing, one end of the housing having a screw-type connection for interconnection with the FC-type optical fiber connector, and the opposite end of the adapter housing being open for providing an access into the cavity; and a unitary, one piece insert being insertable through said opposite end of the housing so as to be mounted in the axial cavity of the adapter housing and including a push-pull-type connection for interconnection with the SC-type optical fiber connector inserted through said opposite open end of the adapter housing.

2. The adapter assembly of claim 1, including complementary interengaging snap-latch means between the insert and the adapter housing for latching the insert in the axial cavity upon insertion of the insert into the cavity.

3. The adapter assembly of claim 1, including a sleeve mounted axially in said unitary insert for receiving and coaxially aligning the ferrules of the FC-type optical fiber connector and the SC-type optical fiber connector.

* * * * *